United States Patent [19]

Jackson et al.

[11] Patent Number: 5,962,574
[45] Date of Patent: Oct. 5, 1999

[54] WET-ON-WET PRIMER WITH LOW FILM BUILD U.V. LIGHT PROTECTION

[75] Inventors: Michael L. Jackson, LaGrange, Ill.; Frank A. Stubbs, Schererville, Ind.; Joseph M. Mecozzi, Hammond, Ind.; Dean T. Smith, Crown Point, Ind.

[73] Assignee: Bee Chemical Company, Lansing, Ill.

[21] Appl. No.: 08/900,700

[22] Filed: Jul. 25, 1997

[51] Int. Cl.⁶ ............................................ C08K 3/00
[52] U.S. Cl. .................................... 524/495; 524/496
[58] Field of Search ................................ 524/495, 496

[56] References Cited

U.S. PATENT DOCUMENTS

| | | | |
|---|---|---|---|
| 3,707,521 | 12/1972 | De Santis | 260/37 N |
| 3,713,872 | 1/1973 | Porter, Jr. et al. | 117/75 |
| 3,779,794 | 12/1973 | De Santis | 117/72 |
| 3,926,898 | 12/1975 | Choi et al. | 260/33.4 R |
| 3,996,059 | 12/1976 | Stansfield et al. | 106/308 N |
| 4,220,679 | 9/1980 | Backhouse | 427/401 |
| 4,375,498 | 3/1983 | Le Minez et al. | 428/416 |
| 4,391,858 | 7/1983 | Batzill | 427/407.1 |
| 4,403,003 | 9/1983 | Backhouse | 427/407.1 |
| 4,477,536 | 10/1984 | Wright et al. | 428/522 |
| 4,477,618 | 10/1984 | Singer et al. | 524/157 |
| 4,529,632 | 7/1985 | Fujii et al. | 427/409 |
| 4,533,681 | 8/1985 | Cassatta et al. | 523/400 |
| 4,533,703 | 8/1985 | Kordomenos et al. | 525/440 |
| 4,546,046 | 10/1985 | Etzell et al. | 428/460 |
| 4,563,372 | 1/1986 | Kurauchi et al. | 427/409 |
| 4,576,868 | 3/1986 | Poth et al. | 428/423.1 |
| 4,598,111 | 7/1986 | Wright et al. | 524/40 |
| 4,728,543 | 3/1988 | Kurauchi et al. | 427/407.1 |

FOREIGN PATENT DOCUMENTS

| | | |
|---|---|---|
| 46-002340 | of 0000 | Japan . |
| 1-110571 | 4/1989 | Japan . |
| 4-225072 | 8/1992 | Japan . |
| 8-269394 | 10/1996 | Japan . |
| 2000157 | 1/1979 | United Kingdom . |
| 2159161 | 11/1985 | United Kingdom . |

OTHER PUBLICATIONS

Solsperse Hyperdispersants, Vendor's Brochure.
Dispersion + Solsperse Hyperdispersants, Vendor's Brochure.
Solsperse 24000 Data Sheet, Zeneca Inc., Apr. 1997.
Solsperse 24000 Material Safety Data Sheet No. 4281, ICI Americas Inc., Oct. 1991.
Solsperse 24000 Material Safety Data Sheet No. 5708, Zeneca Inc., Apr. 1993.
Solsperse 5000 Data Sheet, Zeneca Inc., Apr. 1997.
Solsperse 5000 Material Safety Data Sheet No. 1126, Zeneca Inc., Feb. 1997.
Boggs et al., "Characterization and Rheological Investigation of Polymer Microgels Used In Automotive Coatings", J. Coatings Tech., vol. 68, No. 855, 63–74 (1996).
Bauer et al., "Effect of Cross–Linked Polymeric Microparticles on the Rheology of High–Solids Coatings", Ind. Eng. Chem. Prod. Res. Dev., vol. 21, No. 4, 686–690 (1982).
Funke, "Microgels–Intramoleculary Crosslinked Macromolecules: Potent Components of Organic Coatings", J. Coatings Tech., vol. 60, No. 767, 69–76 (1988).
EPO Search Report dated Nov. 27, 1998.
Dispersion + Solsperse Hyperdispersants, Vendors Brochure.

*Primary Examiner*—Edward J. Cain
*Attorney, Agent, or Firm*—Steven C. Benjamin; Gerald K. White

[57] ABSTRACT

A sprayable, solvent-borne, primer composition for use as a first coat on light-sensitive, automotive plastic parts. The primer serves as a barrier to block ultraviolet light penetration to the underlying substrate and to prevent migration of substrate degradation and by-products up into the topcoat finishes. The primer is a solvent blend of a film-forming crosslinkable polymer resin, a crosslinker for the resin, a catalyst, carbon black pigments surface modified with a polymer dispersant and an organic pigment derivative co-dispersant, crosslinked polymer microgel particles, and U.V. absorbers and optional antioxidants. The surface modification on the carbon black pigments results in higher pigment loadings, which, in turn, imparts U.V. light protection at exceptionally low dry film builds. Furthermore, the microgel particles cause the primer to build in viscosity and set up a gel structure in its uncured state, which allows the primer to be overcoated wet-on-wet with automotive topcoat finishes and cured simultaneously in a single bake without diminishing the topcoat appearance and physical properties. The need for a separate primer bake prior to topcoat application is, therefore, eliminated.

30 Claims, No Drawings

WET-ON-WET PRIMER WITH LOW FILM BUILD U.V. LIGHT PROTECTION

FIELD OF THE INVENTION

This invention relates to a primer composition for protecting painted automotive plastic parts from the effects of degradation resulting from exposure to ultraviolet (U.V.) light. It relates more particularly to an automotive primer composition which provides a U.V. light-blocking barrier coat at ultra low dry film builds and which can be overcoated wet-on-wet with automotive topcoats and cured together without requiring a separate primer cure cycle.

BACKGROUND OF THE INVENTION

Reaction injection molded (RIM) urethane, a thermosetting plastic, has been widely used in recent years as a material of construction for exterior automotive parts, such as bumpers and other automotive body and trim parts. RIM urethane is a relatively inexpensive, easy to mold, and temperature resistant material with good flexibility and impact strength, properties which are desirable for exterior automotive applications. However, RIM urethane, because of its high aromatic isocyanate content, is very light sensitive and rapidly degrades and yellows when exposed to U.V. light. Furthermore, the degradation by-products tend to migrate up into the topcoat finish, marring its aesthetic and protective properties. Yellowing, chalking, fading, cracking, and delamination of topcoats are common effects of RIM degradation.

Protective primers have been developed in the past for application beneath automotive topcoats, in order to inhibit U.V. light penetration into the underlying RIM substrate and prevent RIM degradation and by-product migration. Current RIM primers in use today are typically formulated as sprayable, high solids, solvent borne compositions based on polyester/melamine resin binders, carbon black pigments, U.V. absorbers, and catalysts, together with other conventional additives, such as mar/slip additives, flow control agents, antioxidants, etc.

Yet, the primers today must be coated over the RIM urethane at high dry film thicknesses, typically ranging from 20 to 25 microns (0.8 to 1.0 mils), to provide adequate UV protection. High film builds are, however, undesirable from the standpoint that more primer material must be applied, which, in turn, increases material costs as well as volatile emissions. In the past, it has not been possible to improve U.V. light protection at lower film builds by increasing the levels of U.V. light-blocking carbon black pigments in the primers. Prior attempts to increase carbon black loadings to above current levels (i.e., pigment to binder ratio of 0.04) have generally been unsuccessful. The resultant primers have proven unworkable, since the increased amount of carbon black tends to increase the viscosity to levels where the primer cannot be sprayed through standard spray equipment.

Current primers also require a separate cure cycle before topcoat application, typically performed in a separate bake for 20 to 30 minutes at 250° F., in order to achieve good initial appearance and adhesion. Yet, in its uncured state, the primer coat generally lacks the ability to holdout the topcoat if applied direct thereover. The topcoat would, in turn, tend to migrate and sag down into primer, marring topcoat appearance and physical properties. This prevents the use of a so-called "wet-on-wet" coating technique, wherein one coating is coated directly over another uncured coating followed by curing the multi-layered coating together in one step without the need for a separate bake in between.

More recently, wet-on-wet coating techniques have been practiced with the automotive topcoats. wherein a first topcoat layer, such as a color basecoat, is initially applied over a cured primer layer, then overcoated wet-on-wet with a second topcoat, such as a clear overcoat, and finally cured simultaneously in a single topcoat bake. The primer is not able to participate in the wet-on-wet coating process and must be separately baked prior to topcoat application. Separate bakes, however, are undesirable, since they result in higher production times and energy costs.

U.V. protection at low film builds and wet-on-wet coating with topcoats have not heretofore been possible with current primers, which contributes to the cost of painting RIM urethane parts. This has led the automotive industry to use replacement substrates, such as thermoplastic olefins, having both lower processing and material costs. It would be desirable to provide a primer composition which can overcome the foregoing drawbacks, so as to make the use of RIM urethane substrates for automotive applications once again attractive to the industry.

What is needed is a primer composition that is suitable for coating automotive parts, such as RIM urethane substrates, that can form a U.V. barrier coat which inhibits U.V. light penetration at significantly lower film builds to insure long term adhesion, and which prevents underlying substrate degradation and the resultant by-products from migrating up into the topcoat, and that also can be applied wet-on-wet with a topcoat and cured simultaneously in the topcoat bake without detracting from the topcoat appearance, adhesion, and U.V. protection.

SUMMARY OF THE INVENTION

It is an object of this invention, therefore, to provide a primer composition which blocks U.V. light penetration to the underlying substrate, maintaining long term adhesion, at significantly lower dry film builds than current primers.

It is yet another object of this invention to provide a primer composition which prevents underlying substrate degradation and by-products from migrating up through the primer in to overlying topcoat layers.

Still another object of this invention is to provide a primer composition which exhibits top cat holdout in its uncured condition, so as to allow the primer to be coated over a substrate, for example, RIM urethane plastic, using a wet-on-wet technique with one or more topcoats, for example, both a color basecoat and clearcoat, in which only one curing step is needed to simultaneously cure the multi-layered coating.

The aforesaid and other objectives are achieved by providing a primer composition, which comprises a film-forming solvent blend of: a film-forming polymer resin having crosslinkable functional groups, such as a hydroxy-functional polyester resin, a crosslinker for the resin, such as an aminoplast, a catalyst, such as a blocked acid catalyst, U.V. light-blocking pigments, such as carbon black pigments, and, polymer microgel particles, such as crosslinked acrylic resin microgels. The microgel particles are provided in colloidal dimensions to render the primer thixotropic, which provides for excellent hold out of the topcoats when applied directly over the uncured or "wet" primer. The carbon black pigments are surface modified with a blend of a polymer dispersant, such as an amine-terminated polyester, and an organic pigment derivative co-dispersant, such as an organic amine or ammonium salt of a copper phthalocyanine derivative containing acid radicals, such as sulfonic acid radicals. The surface modification dramatically increases the carbon black loadings, which provides for excellent hiding and ultraviolet light block out at extraordinarily low dry film builds. U.V. absorbers and optional hindered amine light stabilizers, antioxidants, mar/slip agents, wetting agents, flow control agents, leveling agents, antisagging agents, etc., can also be included.

The aforesaid and other aspects of this invention are further achieved by providing a wet-on-wet method of forming a multi-layered coating on a substrate, such as a RIM urethane part, which includes: applying a thixotropic primer composition of the aforesaid character having excellent topcoat holdout properties onto the substrate; sequentially applying thereover, wet-on-wet, a color basecoat and a clearcoat; and, thermally curing the multi-layered coatings simultaneously in a single bake, thereby eliminating the need for a separate primer cure cycle and associated costs.

The aforesaid and other aspects of this invention are still further achieved by providing a coated substrate, such as RIM urethane part, having a multi-layered coating, with the primer composition of the aforesaid character being applied as the initial coat followed by wet-on-wet overcoating with topcoats and curing all coats together in a single bake.

The various objects, features and advantages of this invention will become more apparent from the following description and appended claims.

DETAILED DESCRIPTION OF THE PREFERRED EMBODIMENTS OF THE INVENTION

This invention provides a sprayable, solvent borne, thermosetting, primer composition, especially suited for coating over U.V. light sensitive substrates, such as RIM urethane substrates which are commonly used in the manufacture of exterior parts for automobiles. The primer of this invention has the ability to incorporate extraordinarily high levels of U.V. light-blocking carbon black pigments, while still maintaining excellent flowability and sprayability. This allows the primer to exhibit U.V. light block out at very low dry film thicknesses, which, in turn, significantly reduces the amount of primer required during application, and, therefore, reduces the volatile emissions and material costs during primer application. Migration of degradation and other by-products from the underlying substrate up through the primer into the topcoats is also substantially prevented.

The primer composition of this invention further exhibits excellent thixotropic properties upon application, which translates into excellent holdout of topcoats when applied directly thereover. This, in turn, allows the primer to be applied wet-on-wet with the topcoats without the topcoats sagging down into or intermixing with the uncured primer, followed by curing the multi-layered coating together in a single bake step. Wet-on-wet coating eliminates the need for a separate primer curing cycle before topcoat application, and, consequently, lowers production time and reduces energy costs, while still maintaining all required physical properties, including appearance, adhesion, durability, weatherability, impact and solvent resistance and U.V. protection.

Throughout this specification, all parts and percentages specified herein are by weight unless otherwise stated.

FILM-FORMING RESIN

The primer composition of this invention includes a film-forming polymer resin constituent, which may be any of the resins traditionally known to be useful in primer compositions. The film-forming polymer resins useful herein generally contain a plurality of crosslinkable functional groups. One suitable class of resins useful in this invention include polyfunctional polyester resins, especially polyester resins having a plurality of crosslinkable hydroxyl groups, or commonly referred to as polyester polyols. Preparation of such polyester polyol resins may carried out by methods which are well known and routinely practiced by those of ordinary skill in the art. For example, condensation reactions can be carried out between one or more polyhydric alcohols and one or more polycarboxylic acids, or anhydrides thereof.

Suitable polyhydric alcohols include, without limitation, ethylene glycol, propylene glycol, butylene glycol, 1,6 hexylene glycol, neopentyl glycol, diethylene glycol, triethylene glycol, dipropylene glycol, tetraethylene glycol, glycerol, trimethylolpropane, trimethylolethane, pentaerythritol, dipentaerythritol, tripentaerythritol, hexanetriol, cyclohexane dimethanol, butylene-ethylene propanediol, oligomers of styrene and allyl alcohol, and the condensation products of trimethylolpropane with ethylene oxide or propylene oxide, etc.

Suitable polycarboxylic acids include, without limitation, succinic acid, adipic acid, azelaic acid, sebacic acid, maleic acid, fumaric acid, malonic acid, itaconic acid, phthalic acid, isophthalic acid, terephthalic acid, trimellitic acid, and pyromellitic acid, hexahydrophthalic acid, cyclohexane dicarboxylic acid, methyl hexahydrophthalic acid, or their anhydrides.

The polyester polyol resins of this invention generally have a hydroxyl number from about 50 to about 500, preferably from about 150 to about 350. The hydroxy functionality of the resin is generally from about 2 to about 6 hydroxyl groups per molecule (theoretical), preferably from about 2 to about 4. The polyester polyol resins of this invention generally have an acid value from about 0 to about 25, preferably from about 0 to about 5. The viscosity of the resin is generally from about 1,000 to about 10,000 centipoises, preferably from about 2,500 to about 7,500.

The polyester polyol resins found especially suitable for use in the primer composition of this invention include one or more flexible, low viscosity, polyester triols, especially those prepared by reacting at elevated temperatures a mixture of adipic acid, neopentyl glycol, and trimethylolpropane, preferably in a molar ratio of between about 3:3:1 and about 2:2:1. The preferred polyester triols, in particular, allow the primer to develop exceptionally high crosslink densities and yet still maintain desired flexibility and impact resistance, properties which are desirable for automotive exterior applications. Furthermore, it is believed that the resultant high crosslink densities enhance the ability of the primer to prevent migration of by-products from the substrate up through the primer and into the topcoats. These by-products have been shown to cause discoloration of the topcoats during the normal aging process. Reference can be made, for example, to our earlier U.S. Pat. No 5,489,448 (Jackson et al.) for a further explanation of preferred polyester triol resins and their methods of preparation, which disclosure is incorporated by reference herein in its entirety.

Instead of being a polyester polyol resin, the film-forming resin constituent of the primer composition may be polyfunctional polyether resins, especially polyether resins having a plurality of crosslinkable hydroxyl groups, or commonly referred to as polyether polyols. Such polyether polyol resins may be prepared in any well known manner routinely practiced by those of ordinary skill in the art. For example, condensation reactions can be carried out at elevated temperatures between one or more polyhydric alcohols and one or more alkylene oxides.

Suitable alkylene oxides include, without limitation, ethylene oxide, propylene oxide and 1,2-butylene oxide. Suitable polyhydric alcohols include, without limitation, those previously mentioned above with respect to the polyester polyol resins. Typical polyether diols include the condensation products of propylene glycol or dipropylene glycol and ethylene oxide and/or propylene oxide. Typical polyether triols include the condensation products of hexanetriol, trimethylolpropane, or glycerol and ethylene oxide and/or propylene.

The polyether polyol resins will have similar hydroxyl numbers, hydroxyl functionalities, and acid numbers as those listed above for the polyester polyol resins, although their viscosities will generally be somewhat lower. Polyether polyols are generally not chosen over polyester polyol resins due to reduced weatherability.

It will be apparent to those skilled in the art that other suitable hydroxy-functional film-forming resins, such as hydroxy-functional acrylics and epoxies, could be substituted for those listed above with reasonable effectiveness, although the hydroxy-functional polyester resins are most preferred.

CROSSLINKER

The primer composition of this invention also includes a curing agent or crosslinker constituent for crosslinking the film-forming resin, so as to form a continuous hardened film. The crosslinker may be any of those traditionally known to be useful in coating compositions. One preferred class of crosslinker resins for purposes of this invention includes aminoplast resins. Aminoplast resins are based on the condensation products of aldehydes, typically formaldehyde, with amino- or amido-group carrying substances, such as melamine, urea, dicyanodiamide, and benzoguanamine. Aminoplasts which are modified with lower alkanols having from about 1 to 4 carbon atoms are advantageous. An especially preferred aminoplast resin used in the primer composition of this invention is a methylated melamine-formaldehyde resin, such as hexamethoxymethyl melamine. Another preferred aminoplast resin is a butylated melamine-formaldehyde condensate, such as butoxymethyl melamine.

The aminoplast crosslinker functions as a crosslinking agent in the primer composition by reacting with the hydroxyl functionality of the film-forming resin. In order to achieve the outstanding properties which make these primers particularly useful, it is desirable that the amount of crosslinking agent be sufficient to substantially completely react with the hydroxyl functionality present. Typically, this translates into the aminoplast resin being present in the primer composition in an amount from about 20 to about 70% by weight of total resin solids, preferably from about 25 to about 50% by weight.

Other suitable crosslinkers, including carbamates, isocyanates, blocked isocyanates and the like, will be apparent to those skilled in the art.

CATALYST

The primer composition may also incorporate a suitable catalyst constituent to increase the rate of the crosslinking reaction between the film-forming resin and the curing agent. The catalyst may be any of those traditionally known to be useful in coating compositions. One preferred class of catalysts useful for purposes of this invention include acid catalysts, such as sulfonic acids. Suitable sulfonic acid catalysts include, without limitation, methane sulfonic acid, p-toluene sulfonic acid, naphthalene sulfonic acid, dodecylbenzene sulfonic acid, and dinonylnaphthalene sulfonic acid. Maleic acid, alkyl or aryl acid phosphates, such as butyl acid phosphates and phenyl acid phosphate, or alkyl acid maleates, such as butyl acid maleate and ethyl acid maleate, can also be used. Additionally, the catalytic action may be supplied by the incorporation of free acid groups in the film-forming resin.

Blocked acid catalysts are especially preferred in the primer composition because they improve shelf stability by preventing the curing reaction from advancing prior to baking. The acid catalyst may be blocked, for instance, with amines, such as triethylamine, diethylamine diethylethanolamines, pyridines and the like. These blocking agents neutralize the acid until the baking process takes place, which at that time the blocking agent is released and the free acid is allowed to function as a catalyst to the crosslinking reaction. Examples of such blocked catalysts include those sold under the trade name Nacure by King Industries. Other suitable catalysts will be apparent to those skilled in the art.

The catalyst is generally employed in the primer composition in an effective amount to initiate the crosslinking reaction at commercially acceptable rates. Typically, the catalyst is included in the primer in an amount from about 0.2 to about 5% by weight of total resin solids, preferably from about 1 to about 3% by weight.

U.V. PIGMENT

One important aspect of the primer composition of this invention is that it provides excellent U.V. light protection of the underlying substrate at extraordinarily low dry film builds, for instance down to about 5 microns (0.2 mils) or even lower, which has not heretofore been possible with traditional primers that generally require about 12.5 to 20 microns (0.5 to 0.8 mils) to achieve a similar U.V. light block out effect. This is accomplished through incorporation in the primer of significantly greater amounts of U.V. light-blocking pigments, such as carbon black, yet without detracting from the desired flowability and sprayability of the primer.

The preferred class of U.V. pigments incorporated in the primer composition are carbon black pigments. Carbon black is an excellent U.V. pigment, since it inherently hides the substrate and blocks out U.V. light from penetrating down through the primer film.

To significantly increase the carbon black loadings in the primer of this invention, a unique surface modification is made to the carbon black pigments. The surface modification significantly improves the compatibility and dispersibility of the carbon black particles within the film-forming resin system. In particular, the surface modification comprises two components which are intimately blended with the carbon black particles, both of which fall in a class of materials known as "hyperdispersants". A co-dispersant or synergist compound containing functional polar groups is intimately mixed with carbon black to wet out and coat the relatively non-polar surface of the primary carbon black particles. The co-dispersant is believed to be adsorbed onto the surface of the carbon black particles, rendering the surface more polar. The increased polarity is used to anchor a polymeric dispersant compound having anchoring functional groups onto the surface of the modified carbon black particles.

The co-dispersant, in turn, renders the carbon black more compatible with the film-forming constituents, thus allowing significantly more carbon black than in the past to be stably loaded into the primer composition without increasing the viscosity to unworkable levels.

The co-dispersants and dispersants useful in the primer composition may be any of those materials traditionally known to facilitate high carbon black or pigment loadings without significantly increasing the viscosity of the coating system.

Suitable co-dispersants include, without limitation, those which fall in the class of organic pigment derivatives, such as copper phthalocyanine derivatives. Common examples of copper phthalocyanine derivatives include, without limitation, organic amine or substituted ammonium salts of copper phthalocyanine derivatives containing sulfonic or carboxylic acid radicals, such as fatty amine salts of sulfonated copper phthalocyanine, or the like. Other examples of dispersing agents comprising organic amine or substituted ammonium salts of copper phthalocyanine derivatives are described in U.S. Pat. Nos. 3,996,059; 4,057,436; and, 5,296,023. Examples of other copper phthalocyanine derivatives useful as dispersing agents are described in U.S. Pat. Nos. 3,288,621; 3,323,931; and, 3,917,639; and also in PCT Publication WO/95-17473. The preferred co-dispersants are copper phthalocyanine derivatives available from Zeneca Limited under the trade name Solsperse, particularly Solsperse 5000.

Suitable polymeric dispersants include, without limitation, those which fall in the class of organic amine-terminated polyesters or polyester/polyamine copolymers. Common examples of amine-terminated polyesters that may be employed in the primer composition of this invention include, without limitation, those having the formula Y—CO—ZR wherein Z is a divalent bridging group which is attached to the carbonyl group through an oxygen or nitrogen atom, R is a primary, secondary or tertiary amino group or a salt thereof with an acid, or a quaternary ammonium salt group, and Y is the residue of a polyester chain which together with the carbonyl group is derived from a hydroxycarboxylic acid of the formula HO—X—COOH wherein X is a divalent saturated or unsaturated aliphatic radical containing at least 8 carbon atoms and in which there are at least 4 carbon atoms between the hydroxy and carboxylic acid groups, such as poly(hydroxystearic acid), or from a mixture of such a hydroxycarboxylic acid and a carboxylic acid which is free from hydroxy groups. The aforesaid dispersing agents are described in U.S. Pat. No. 3,996,059 and U.S. Pat. No. 3,778,287. Examples of other suitable polyester amine or polyester ammonium salt polymeric dispersants are described in previously mentioned U.S. Pat. No. 4,057,436 and in PCT Publication WO/95-17473. Examples of other polymeric dispersants can be found in U.S. Pat. Nos. 4,224,212; 4,398,955; 4,518,435; 4,861,380; 4,954,177; 5,279,766; and, 5,300,255. The preferred polymeric dispersants are available from Zeneca Limited under the trade name Solsperse, particularly Solsperse 24000.

Other suitable co-dispersants and dispersants will be apparent to those skilled in the art. It is also possible to use the dispersant without the co-dispersant, although this embodiment is less preferred, since the carbon black tends to be less stably dispersed in the primer system.

The pigment to total dispersant ratio found suitable for use in the primer composition generally ranges from about 1:1 to about 10:1, preferably from about 5:1 to about 7:1. The suitable dispersant to co-dispersant ratio generally ranges from about 1:1 to about 50:1, preferably from about 2:1 to about 6:1.

In preparing the preferred surface modified carbon black pigments, a pigment dispersion is preferably employed. The dispersion generally includes a mixture of carbon black pigments, dispersant, and co-dispersant, along with an effective amount of solvent to carry the dispersants to the carbon black pigments. Up to 50% by weight of the dispersion can include a film-forming resin such as previously mentioned above. The film-forming resin in the dispersion reduces the likelihood of pigment shock and reflocculation during mixing which would tend to reduce the excellent hiding properties and appearance of the primer film.

The preferred surface modified carbon black pigment is generally included in the primer composition in amount from about 1 to about 100% by weight of total resin solids, preferably from about 10 to 20% by weight. The pigment to binder ratio generally ranges from about 1:1 to about 1:100, preferably from about 1:4 to about 1:10, and even more preferably about 1:6. Pigment to binder ratios greater than about 1:25 have not heretofore been possible.

Other suitable pigments, fillers and dyestuffs can also be included in the primer composition, preferably of the U.V. light-blocking type.

U.V. ABSORBER

To further protect the coated substrate from premature degradation due to U.V. light exposure and to enhance the weatherability of the coating system, the primer composition of this invention does include a U.V. light absorber constituent, which may be any of those traditionally known to be useful in coating compositions. Suitable ultraviolet light absorbers that are useful in this invention include, without limitation, benzophenones, such as dodecyl oxibenzophenone, 2,4-dihydroxybenzophenone, hydroxy-benzophenones containing sulfonic acids, 2,4-dihydroxy-3', 5'-ditertiary butyl benzophenone, 2,2',4'-trihydroxy benzophenone esters of dicarboxylic acids, 2-hydroxy-4-acryloxyethoxybenzophenone, aliphatic monoesters of 2,2', 4'-trihydroxy-4'-alkoxybenzophenone, and 2-hydroxy-4-methoxy-2'-carboxybenzophenone. Triazoles are especially preferred such as 2-phenyl-4-(2',4'-dihydroxybenzoyl) triazole, substituted benzotriazoles such as hydroxy-phenyl-triazoles such as 2-(2'-hydroxy-5'methylphenyl) benzotriazole, 2-(2'-hydroxy-phenyl)benzotriazole, 2(2'-hydroxy-5'octylphenyl)napthotriazole. Triazines such as 3,5-dialkyl-4-hydroxyphenyl derivatives of triazine sulfur containing derivatives of diallyl-4-hydroxyphenyl triazines, hydroxyphenyl-1,3,5-triazine and such triazines containing sulfonic acid groups, aryl 1,3,5 triazines, orthohydroxyl aryl-s-triazone. Benzoates such as dibenzoate of diphenylol propane, tertiary butyl benzoate of diphenylol propane, nonyl phenyl benzoate, octyl phenyl benzoate, resorcinol dibenzoate.

Other suitable U.V. absorbers include lower alkyl thiomethylene containing phenols, substituted benzenes such as 1,3-bis-(2'hydroxybenzoyl) benzene, metal derivatives of 3,5-di-t-butyl-4-hydroxyphenyl proprionic acid, asymmetrical oxalic acid diarylamides, alkylhydroxyphenyl-thioalkanoic acid esters, dialkylhydroxyphenyl alkanoic acid esters of di-and tri-pentaerythritol, oxalic acid diamides such as 4,4'-di-octyloxy,5,5'-di-tert-butyl-oxanilide, 2,2'-didodecyloxy-5,5'-di-tert-butyl-oxanilide, 2-ethoxy-2'-ethyl-oxanilide, N,N'-bis(3-dimethylaminopropyl)-oxalamide, and 2-ethoxy-5-tert-butyl-2'-ethyloxanilide, phenyl and naphthalene substituted oxalic acid diamides, methyl beta-(3,5-di-tert-butyl-4-hydroxyphenyl)proprionate, α,α'-bis-(2-hydroxyphenol)-di-iso-propyl-benzene, 3,5'-dibromo-2'-hydroxy acetophenone, ester derivatives of 4,4-bis-(4'-hydroxyphenyl)pentanoic acid with at least one unsubstituted position ortho to the aromatic hydroxyl groups, organophosphorus sulfides such as bis(diphenyl phosphinothioyl)monosulfide and bis(diphenyl phosphinothioyl) disulfide, 4-benzoyl-6-(dialkyl-hydroxy-benzyl)resorcinol, bis(3-hydroxy-4-benzoylphenoxy) diphenyl silane, bis(3-hydroxy-4-benzoylphenoxy)dialkyl silane, 1,8-naphthalimides, α-cyano, β,β,-diphenylacrylic acid derivatives, bis-(2-benzoxazolyl) alkanes, bis-(2-naphththoxazolyl)alkanes, methylene malonitriles containing aryl and heterocyclic substitutes, alkylene-bis-dithiocarbanate, 4-benzoyl-3-hydroxyphenoxy ethyl methacrylate, aryl or alkyl substituted acrylonitriles, 3-methyl-5-isopropylphenyl-6-hydroxy coumarone. Other suitable U.V. absorbers will be apparent to those skilled in the art.

The U.V. absorbers, included in the primer composition, are generally present in amount from about 1 to 8% by weight of total resin solids, preferably from about 4 to 6% by weight.

OPTIONAL ANTIOXIDANT

In addition to the aforesaid U.V. absorbers, antioxidants such as hindered amine light stabilizers and other antioxidants may be used for increased U.V. protection, which may be any of those traditionally known to be useful in coating compositions. The U.V. absorbers listed above are generally designed to absorb the U.V. light and dissipate the energy, whereas the hindered amine light stabilizers and other antioxidants are designed to scavenge and terminate free radicals which have been generated in the primer film by the U.V. light. The termination of free radicals limits the amount of damaging light-initiated oxidation or degradation that takes place in the underlying substrate.

Suitable hindered amine light stabilizers include, without limitation, bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl) butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]-decane-2,4-dione, tris(2,2,6,6-tetrametthylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5. 1.11.2] heneicosane, polycondensation product of 2,4-dichloro-6-tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidin-4-yl) and 1,2-dibromoethane, tetrakis (2,2,6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N",N'''-tetrakis[(4,6-bis(butyl-2,2,6,6-tetramethylpiperidin-4-yl)-amino-s-triazin-2-yl]-1,10-diamino-4,7-diazadecane, mixed [2,2,6,6-tetramethylpiperidin-4-yl/β, β,β',β'-tetramethyl-3,9-(2,4,8,10-tetraoxaspiro[5.5]-undecane) diethyl] 1,2,3,4-butanetetracarboxylate, mixed [1,2,2,6,6-pentamethylpiperidin-4yl/β, β,β',β'-tetramethyl-3,9-(2,4,8,10-tetraoxaspiro[5.51-undecane) diethyl] 1,2,3,4-butanetetracarboxylate, octamethylene bis(2,2,6,6-tetramethylpiperidin-4-carboxylate), 4,4'-ethylenebis(2,2,6,6-tetramethylpiperazin-3-one), N-2,2,6,6-tetramethylpiperidin-4yl-n-dodecylsuccinimide, N-1-acetyl-2,2,6,6-tetramethylpiperidin-4-yl-n-dodecylsuccinimide, 1-acetyl-3-dodecyl-7,7,9,9-tetramethyl- 1,3,8-triazaspiro [4.5]-decane-2,4-dione, di(1-octoxy-2,2,6,6-tetramethylpiperidin-4-yl) sebacate, di(1-cyclohexyloxy-2,2,6,6-tetramethylpiperidin-4-yl) succinate, 1-octyloxy-2,2,6,6-tetramethyl-4-hydroxy-piperidine, poly-[6-tert-octylamino-s-triazin-2,4-diyl][2-(1-cyclohexyloxy-2,2,6,6-tetramethylpiperidin-4-yl)imino]-hexylmethylene-[4-(1-cyclohexyloxy-2,2,6,6-tetramethylpiperidin-4-yl)imino], and 2,4,6-tris[N-(1-cyclohexyloxy-2,2,6,6-tetramethylpiperidin-4-yl)-n-butylamino]-s-triazine.

Suitable antioxidants include, without limitation, tetrakis alkylene (dialkylhydroxyaryl) alkyl ester alkanes, such as tetrakis methylene (3,3',5-dibutyl-4'-hydroxyphenyl) proprionate methane, reaction product of glycidyl methacrylate and p-amino diphenylamine or n-hexyl-N'-phenyl-p-phenylene diamine, pentaerythritol tetrakis(thioglycoate), trimethylol propane tris(thioglycoate), trimethylol ethane tris(thioglycoate), N-(4-anilinophenyl) acrylamide, N-(4-anilinophenyl) meleamic acid, N-(4-anilinophenyl) maleimide, alkylhydroxyphenyl groups with carboalkoxy linkages to heterocyclic nitrogen compounds containing an imidodicarbonyl or imidodithiocarbonyl group, 3,5-di-tertbutyl-4-hydroxy cinnamonitrile, ethyl-di-terthexyl-4-hydroxyxinnamide, substituted benzyl ethers of beta-substituted hydroxyphenyl propionic acids, bis-(hydroxyphenyl alkylene) alkylisocyanurates, tetrakis hydroxybenzyl phosphonium halides alone or in combination with a dialkylthiodialkanoate, thiodimethylidyne tetrak-isphenols alone or in combination with a dialkylthiodialkanoate, phosphite or phosphonates, dihy-droxycarbylhydroxy phenyl aryl or alkyl phosphonites, phosphonates, phosphates, phosphites, phosphinates, phosphinites, phosphororthionates, or phosphinothionates, diphenyl bis(3,5-ditertbutyl-4-hydroxyphenoxy) silane, hydrocarbyl hydroxyphenyl dihydrocarbyl dithiocarbamates, such as 3,5-ditertbutyl-4-hydroxy phenyl dimethyldithio carbamate and amino benzyl thioether. Other suitable antioxidants and light stabilizers will be apparent to those skilled in the art.

These materials, when included in the primer composition, are generally present in amount from about 0.5 to 5% by weight of total resin solids, preferably from about 1 to about 2% by weight.

MICROGEL

Another important aspect of the primer composition of this invention is that it exhibits excellent Theological properties, which, in turn, provides for excellent hold out of the topcoats when applied directly over the uncured primer. This allows the primer to be coated wet-on-wet with the topcoats and cured simultaneously during the topcoat bake, which has not hitherto been possible with traditional primers which generally require a separate primer bake.

To impart thixotropic character to the primer composition of this invention, a crosslinked polymer microparticle or polymer microgel constituent is incorporated. The polymer microgel suitable for use in this invention may be composed of various types of crosslinked polymers. The crosslinked polymers are typically formed with a high degree of internal crosslinking so as to be insoluble but stably dispersible in the film-forming constituents. In addition, the crosslinked polymers are provided in colloidal dimensions. It is believed that the insoluble microgel particles when incorporated in the primer composition tend to interact with each other and form a spatial lattice in the primer. The interactions, for instance, may be due to dipole-dipole forces or hydrogen bridge bonds. Due to the interaction, a loose spatial lattice is formed between the microgel particles present in the primer composition, which can be reversibly dismantled by shearing. The loose spatial lattice, i.e., a gel structure, therefore, renders the primer composition thixotropic.

The benefits imparted by the microgel particles to the primer include, for instance, the microgel particles prevent carbon black pigment settling, help obtain good film builds, and greatly reduce the sagging tendency of high solids primer compositions based on low molecular weight resins. Most importantly, the thixotropic properties allow for excellent hold out of the topcoats when applied directly over the primer composition of this invention in a wet-on-wet coating process. During wet-on-wet coating, the thixotropy of the primer, resulting from the presence of the microgel, prevents the topcoats from intermixing and sagging down into the uncured primer. Topcoat hold out eliminates the need for a separate primer cure cycle before topcoat application.

Of particular interest for the purposes of this invention are crosslinked acrylic microgel particles. Preparation of such acrylic microgels may be carried out by methods which are well known and routinely practiced by those of ordinary skill in the art. Typically, the microgels are acrylic addition polymers derived from one or more allyl acrylates or methacrylates, optionally together with other ethylenically unsaturated copolymerizable monomers.

Suitable allyl acrylates or methacrylates include, without limitation, methyl (meth)acrylate, ethyl (meth)acrylate, propyl (meth)acrylate, butyl (meth)acrylate, 2-ethylhexyl (meth)acrylate, isobutyl (meth)acrylate, isobornyl (meth) acrylate, and cyclohexyl (meth)acrylate. Suitable other ethylenically unsaturated monomers include vinyl acetate, vinyl propionate, acrylonitrile, acrylamide, styrene, and vinyl toluene. Since the polymer is required to be crosslinked, there may be included in the monomers from which the polymer is derived a minor proportion of a monomer which is polyfunctional with respect to the polymerization reaction, such as di- or tri-functional (meth) acrylates, such as ethylene glycol dimethacrylate, trimethylol propane tri(meth)acrylate, and diethylene glycol dimethacrylate, allyl methacrylate, or divinylbenzene. Alternatively, there may be included in the monomers minor proportions of two other monomers carrying pairs of functional groups which can be caused to react with one another either during or after polymerization, such as epoxy and carboxyl, for example, in glycidyl methacrylate and acrylic acid, anhydride and hydroxyl, or isocyanate and hydroxyl, for example, in vinyl isocyanate and hydroxethyl (meth) acrylate.

Several methods are known to produce such acrylic microgel particles. One such method is the non-aqueous dispersion method which comprises polymerizing the monomers in an inert organic liquid in which the monomers are soluble but the resulting polymer is insoluble, such as aliphatic hydrocarbons, to form a nonaqueous dispersion of a crosslinked copolymer. Any known amphipathic stabilizer or instead a polymeric precursor may be used in the dispersion polymerization to maintain a colloidal state. Alternatively, the microgel particles may be prepared by emulsion polymerizing the monomers in an aqueous medium, and then removing water from the emulsion by, for example, solvent substitution, centrifugation, filtering or drying, although solvent substitution is preferred. Any known emulsifier and/or dispersing agent may be used in the emulsion polymerization. Emulsifiers having anionic or amphoteric ionic groups are particularly preferred. Any known stabilizer may be used as well in the emulsion polymerization. The aforesaid methods are well known to those of ordinary skill in the art and replete in literature.

The microgel particles so prepared then are transferred into an organic medium, typically using one or more of the solvents described below that is compatible with the primer composition, to provide a microgel dispersion. The microgel dispersion may be merely blended in the polymer solution of the primer composition without the need for elaborate conditions.

Other suitable microgels which can be used in the primer will be apparent to those skilled in the art.

The microgel particles generally have a colloidal size from about 20 to 500 nanometers, in diameter, preferably from about 30 to 70 nanometers.

The proportion of the microgel present in the primer composition of this invention ranges from about 1 to about 20% by weight of total resin solids, preferably from about 5 to about 10% by weight.

OTHER OPTIONAL ADDITIVES

Other conventional functional additives such as mar/slip agents, wetting agents, flow control agents, leveling agents, antisagging agents, etc., may be employed in the primer composition.

SOLVENT

The aforesaid components of the primer composition are blended together in a suitable organic solvent, such as those commonly used in liquid coatings, to facilitate formulation and spray application. Generally, the primer composition is utilized at as high a solids content as the application conditions will allow so as to keep volatile emissions at a minimum level. Suitable organic solvents such as those conventionally used in coating compositions include, without limitation, aromatic hydrocarbons, such as toluene and xylene, various petroleum fractions, such as SC 100, esters such as butyl acetate, ketones, such as acetone, methyl ethyl ketone, and methyl isobutyl ketone, alcohols such as butanol, and other cycloaliphatic and aromatic hydrocarbons, esters, ketones, glycol ethers, such as butyl Cellosolve, glycol ether esters, such as butyl Cellosolve acetate. Cellosolve is a trademark of Union Carbide Corporation. Other suitable solvents will be apparent to those skilled in the art.

The solvent should be one that will not react with the film-forming constituents and can readily be removed in the application and curing process. The solvent is provided in an effective amount to provide the primer composition that is sprayable through conventional coating equipment and that can flow out and level to form a smooth surface over the substrate when applied.

PRIMER PREPARATION

The primer composition of this invention may be compounded together in any convenient manner known to those skilled in the art.

SUBSTRATES

The primer composition of this invention can be applied as a first coat over a variety of substrates. Substrates of current interest are those used in exterior automotive applications, which include, without limitation, electrodeposition primed metal substrates and plastic substrates, such as thermoset RIM urethane, adhesion promoted or pretreated thermoplastic olefins, Nylon, Nylon PPO blends, and various thermoplastic polyester substrates. The primer, however, is especially suited for U.V. light sensitive RIM urethane moldings. The primer provides a flexible, durable, weatherable, impact resistant, and solvent resistant coating over the substrates with good substrate and intercoat adhesion and appearance together with superior U.V. protection at low film builds and excellent topcoat holdout.

WET-ON-WET COATING METHOD

The primer composition can be applied by conventional methods known to those of ordinary skill in the art. These methods include roll coating, spray coating, dipping or brushing. The presently preferred application technique for automotive exterior parts is by spray coating through the atomizing nozzle of a spray gun.

The primer is preferably sprayed as the first coat of a wet-on-wet process with standard topcoats, requiring only about a two minute flash in-between at ambient temperature or even less time at elevated temperatures. Usually the topcoat includes two coatings, a color basecoat which is applied directly over the primer and a clearcoat which is applied directly over the base coat.

Preferred topcoats include those sold under the trademark UNICOAT® by Morton Automotive Coatings, a division of Morton International. An example of such a basecoat is UNICOAT® UR560 Series Basecoat and an example of such a clearcoat is UNICOAT® 067231 Clearcoat.

Advantageously, the primer composition of this invention can be applied in a "wet-on-wet-on-wet" process directly with the color basecoat and clearcoat. Basecoats and clearcoats have traditionally been applied to primers using a wet-on-wet process. However, it has not heretofore been possible to apply such topcoats over the primer using a wet coating process.

CURING

In the wet-on-wet method, curing of the primer composition is achieved during the topcoat bake. A typical topcoat bake is for about 20 to about 40 minutes at about 240° F. to about 260° F. The plastic deformation temperature of the automobile exterior parts may limit the upper baking temperature. The wet-on-wet technique in which the primer and topcoats are applied wet-on-wet followed by curing the multi-layer coating in a single step allows the finisher to save production time and reduce energy costs by eliminating the separate bake required for traditional primers.

When cured, the primer composition of this invention provides U.V. protection at extraordinarily low dry film thicknesses. Substantially complete hiding and U.V. light block out can be obtained at dry film thicknesses between about 2.5 microns and about 5 microns (0.1 mils to 0.2 mils). The ability to hide and achieve U.V. light block out at such low film builds enables the finisher to reduce volatile organic emissions and material costs by using less primer.

All of the patents mentioned above are hereby incorporated by reference herein in their entireties.

The invention will be further illustrated but not limited by the following examples. All parts and percentages are by weight unless otherwise indicated.

EXAMPLE 1

Polyester Triol Resin 1

A 4-neck 1000 ml flask equipped with an agitator, a thermometer, a cooling condenser and a water trap was charged with 240 g of neopentyl glycol, 26 g of water, 154 g of trimethylol propane, 338 g of adipic acid, and 42 g of xylene. The mixture was heated to 90° C. under nitrogen with mixing commencing once the material was melted sufficiently. The temperature was then increased to 210° C., trapping the water and allowing the xylene to flow back into the reactor. The mixture was maintained at 210° C. until the acid value was below 5.0, then cooled and filtered for use.

EXAMPLE 2

Polyester Triol Resin 2

A 4-neck 1000 ml flask equipped with an agitator, a thermometer, a cooling condenser and a water trap was charged with 259 g of neopentyl glycol, 28 g of water, 110 g of trimethylol propane, 2 g of phenylacid phosphate, 358 g of adipic acid, and 43 g of xylene. The mixture was heated to 90° C. under nitrogen with mixing commencing once the material was melted sufficiently. The temperature was then increased to 210° C., trapping the water and allowing the xylene to flow back into the reactor. The mixture was maintained at 210° C. until the acid value was below 5.0, then cooled and filtered for use.

EXAMPLE 3

Surface Modified Carbon Black Pigment Dispersion

The following ingredients were blended together in the order given to produce a surface modified carbon black dispersion:

| Ingredients | Parts |
| --- | --- |
| Premix And Pump Through A Dispersing Mill Mill To A Hegman Grind Of 7+ | |
| Isobutanol | 6.00 |
| SC100 | 33.50 |
| Polyester Triol Resin 1 | 25.50 |
| Solsperse 24000[1] | 4.00 |
| Solsperse 5000[2] | 1.00 |
| Monarch 1100 Black[3] | 30.00 |
| Total | 100.00 |

[1]Solsperse 24000 is a polymeric dispersant that is available from Zeneca Limited, which is believed to be an amine-terminated polyester resin.
[2]Solsperse 5000 is a copper phthalocyanine derivative co-dispersant that is available from Zeneca Limited, which is believed to be a fatty amine salt of sulfonated copper phthalocyanine blue pigment.
[3]Monarch 1100 Black is a carbon black pigment that is available from Cabot Corporation.

EXAMPLE 4

Polyester/Melamine Primer

The following ingredients were blended together in the order given to provide a solvent borne, sprayable, U.V. protective, primer composition of this invention:

| Ingredients | Parts |
|---|---|
| Charge To Mix Tank | |
| Dipropylene Glycol Methyl Ether Acetate | 15.07 |
| 2-Ethyl Acetate | 3.45 |
| Propylene Glycol Methyl Ether Acetate | 3.44 |
| Isobutanol | 5.32 |
| Xylene | 9.27 |
| Resimene 755[1] | 13.96 |
| Add Under Moderate Agitation | |
| Acrylic Microgel IN67271[2] | 10.17 |
| Polyester Triol Resin 1 | 14.52 |
| Polyester Triol Resin 2 | 1.86 |
| Tinuvin 1130[3] | 1.24 |
| Sanduvor 3206[4] | 0.38 |
| Surface Modified Carbon Black Dispersion | 18.62 |
| Nacure 5543[5] | 2.70 |
| Total | 100.00 |

[1]Resimene 755 is a methylated butylated melamine-formaldehyde condensate crosslinker resin that is available from Monsanto Corporation.
[2]Acrylic Microgel IN67271 is an acrylic microgel that is available from Morton International.
[3]Tinuvin 1130 is a substituted hydroxyphenyl benzotriazole U.V. absorber that is available from Ciba Additives.
[4]Sanduvor 3206 is an oxalanilide U.V. absorber that is available from Clariant Corporation.
[5]Nacure 5543 is a blocked DDBSA acid catalyst that is available from King Industries.

The aforesaid primer had the following physical properties:

| Property | Target |
|---|---|
| #4 Ford Viscosity | 11–13 sec. |
| % Weight Solids | 43.8 |
| Weight Per Gallon | 8.1 lbs. |
| Dry Film Hiding | 0.1–0.2 mil |
| Pigment to Binder Ratio | 1:6 |
| U.V. Light Block Out | 0.2 mil |

EXAMPLE 5

Multi-Layered Coated RIM Urethane Substrate

The primer composition of Example 4 was sprayed onto a DOW Spectrums® 50 automotive RIM urethane plastic substrate, that is available from Dow Chemical, in sufficient thickness to give a dry film build of about 0.2–0.5 mils and allowed to flash for about 90 seconds at ambient temperature. After primer flash, a color basecoat was sprayed directly over the primer in a wet-on-wet coating process with no primer bake necessary in between applications and allowed to flash for about 3–5 minutes at ambient temperature. After basecoat flash, a clearcoat was sprayed directly over the basecoat in a wet-on-wet coating process and allowed to flash for about 12 minutes at ambient temperature followed by about a 30 minute bake at about 250° F.

The painted RIM urethane substrate was then tested according to Chrysler MS-PA40-1 specification of Chrysler Corporation and passed all of the required tests, such as those for atmospheric etch, crock mar resistance, cycle crack, flexibility, Florida weathering, fluid resistance, gravelometer chip resistance, high bake repair, humidity, impact resistance, initial adhesion, solvent resistance, soap and water resistance, and Xenon arc Weather-ometer. Weather-ometer is a trademark of Atlas Electric Devices Company.

EXAMPLE 6

Polyether/Melamine Primer

The following ingredients were blended together in the order given to provide another solvent borne, sprayable, U.V. protective, primer composition of this invention:

| Ingredients | Parts |
|---|---|
| Charge To Mix Tank | |
| Isobutyl Isobutyrate | 6.11 |
| Ethyl Acetate | 7.50 |
| Isobutyl Alcohol | 5.32 |
| Resimene 755 | 13.96 |
| Add Under Moderate Agitation | |
| Acrylic Microgel IN67271 | 28.27 |
| Voranol 220–260[1] | 14.52 |
| Polyester Triol Resin 2 | 1.86 |
| Tinuvin 1130 | 0.76 |
| Sanduvor 3206 | 0.38 |
| Surface Modified Carbon Black Dispersion | 18.62 |
| Nacure 5543 | 2.70 |
| Total | 100.00 |

[1]Voranol 220–260 is a polyether diol resin based on polypropylene glycol that is available from Dow Chemical.

The aforesaid primer had generally the same physicals as the primer of Example 4.

EXAMPLE 7

Multi-Layered Coated RIM Urethane Substrate

The primer composition of Example 6 was sprayed onto a RIM urethane plastic substrate used in automobiles in sufficient thickness to give a dry film build of about 0.3 mils and allowed to flash for about 120 seconds at ambient temperature. After primer flash, a color basecoat was sprayed in sufficient thickness to give a dry film build of about 1.0 mils directly over the primer in a wet-on-wet coating process with no primer bake necessary in between applications and allowed to flash for about 5 minutes at ambient temperature. After basecoat flash, a clearcoat was sprayed in sufficient thickness to give a dry film build of about 1.5 mils directly over the basecoat in a wet-on-wet coating process and allowed to flash for about 12 minutes at ambient temperature followed by about a 30 minute bake at about 250° F.

The painted RIM substrate was then tested according to various short term automotive exterior tests. The results of the testing are given in the Table below:

| Test | Result |
|---|---|
| Initial Intercoat Adhesion | 100% - Pass |
| Initial Adhesion to RIM | 100% - Pass |
| Intercoat Adhesion After 240 Hrs. Humidity | 100% - Pass |
| Adhesion to RIM After 240 Hrs. Humidity | 100% - Pass |

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A primer coating composition capable of protecting a substrate susceptible to degradation by ultraviolet light, said composition serving as a primary coat on said substrate beneath a multilayer color base coat/clear top coat finish, comprising a sprayable, continuous film-forming solvent blend of:
   a) a film-forming polymer resin having crosslinkable functional groups;
   b) a crosslinker for curing said resin;
   c) a catalyst for accelerating said curing;
   d) ultraviolet light-blocking pigments in an amount sufficient to achieve substantially complete ultraviolet light block out through a cured coating film formed from said composition at a dry film thickness of about 5 μm, said pigments being treated with a dispersant in an amount sufficient to render said composition sprayable and flowable into a continuous film; and,
   e) polymer microgel particles in an amount sufficient to prevent intermixing and enable hold out of said color base coat or said color base coat/clear top coat finish upon being applied over said composition wet-on-wet and simultaneously cured therewith.

2. The primer of claim 1, wherein:
said polymer microgel particles have particle sizes ranging from about 20 to about 500 nm.

3. The primer of claim 1, wherein:
said polymer microgel particles are crosslinked acrylic resin particles.

4. The primer of claim 1, wherein:
said U.V. light-blocking pigments are carbon black pigments.

5. The primer of claim 4, wherein:
said carbon black pigments are surface modified with a polymer dispersant.

6. The primer of claim 5, wherein:
said polymer dispersant is an amine-terminated polyester.

7. The primer of claim 5, wherein:
said carbon black pigments are surface modified with an organic pigment derivative co-dispersant along with said polymer dispersant.

8. The primer of claim 7, wherein:
said polymer dispersant is an amine-terminated polyester and said co-dispersant is a copper phthalocyanine derivative.

9. The primer of claim 8, wherein:
said co-dispersant is an organic amine or ammonium salt of a copper phthalocyanine acid derivative.

10. The primer of claim 9, wherein:
said co-dispersant is a fatty amine or ammonium salt of a sulfonated copper phthalocyanine.

11. A thermosetting primer coating composition capable of protecting a substrate susceptible to degradation by ultraviolet light, said composition serving as a primary coat over said substrate beneath a multilayer color base coat/clear top coat finish, comprising a sprayable, continuous film-forming solvent blend of:

a) a film-forming hydroxy-functional polymer resin;
b) a crosslinker for curing said resin;
c) a catalyst for accelerating said curing;
d) carbon black pigments in an amount sufficient to achieve substantially complete ultraviolet light block out through a cured coating film formed from said composition at a dry film thickness of about 5 μm, wherein said carbon black pigments are surface modified with a blend of:
   d1) a polymer dispersant, and
   d2) an organic pigment derivative co-dispersant; and,
e) polymer microgel particles in an amount sufficient to hold out said color base coat or said color base coat/clear top coat finish upon being applied thereover wet-on-wet and simultaneously cured therewith.

12. The primer of claim 11, wherein:
said film-forming resin is a polyester resin having a plurality of hydroxy-functional groups.

13. The primer of claim 12, wherein:
said crosslinker is an aminoplast resin.

14. The primer of claim 13, wherein:
said catalyst is a blocked acid catalyst.

15. The primer of claim 14, wherein:
said polymer microgel particles are crosslinked acrylic resin particles.

16. The primer of claim 15, wherein:
said polymer dispersant is an amine-terminated polyester.

17. The primer of claim 16, wherein:
said co-dispersant is an organic amine or ammonium salt of a copper phthalocyanine acid derivative.

18. The primer composition of claim 11, further comprising:
f) at least one from the group of U.V. absorbers, hindered amine light stabilizers, and antioxidants.

19. The primer composition of claim 11, wherein:
said primer is applied onto said substrate as said primary coat, allowed a sufficient time to build in viscosity and set up a gel structure, then overcoated wet-on-wet with said color base coat or said color base coat and said top coat, and finally cured together with said overcoat(s) in a single bake.

20. The primer composition of claim 11, wherein:
said primer achieves substantially complete U.V. light block out at a dry film thickness of between about 2.5 and about 5 μm.

21. The primer composition of claim 11, wherein:
said primer has a pigment to binder weight ratio of between about 1:4 and about 1:10.

22. The primer of claim 4, wherein:
said primer has a pigment to binder weight ratio of from about 1:4 to about 1:10.

23. The primer of claim 1, wherein:
said primer is a thermosetting composition.

24. The primer of claim 1, wherein:
said substrate is a RIM urethane plastic.

25. The primer of claim 11, wherein:
said substrate is a RIM urethane plastic.

26. A wet-on-wet thermosetting primer coating composition having ultraviolet light protection at low film builds, said composition serving as a primary coat on a substrate beneath one or more topcoat finishes, comprising a sprayable, continuous film-forming solvent blend of:

a) a film-forming hydroxy-functional polyester resin;

b) a sufficient amount of an aminoplast crosslinker for curing said resin;

c) a sufficient amount of a blocked acid catalyst for accelerating said curing;

d) carbon black pigments in a pigment to binder ratio of about 1:4 to about 1:10 to achieve substantially complete ultraviolet light block out through a cured coating film formed from said composition at a dry film thickness of about 5 μm, said pigments being treated with a blend of:
   d1) a polymer dispersant, and
   d2) a copper phthalocyanine derivative co-dispersant; and, e) acrylic polymer microgel particles in an amount sufficient to hold out said one or more top coat finishes upon being applied thereover wet-on-wet and simultaneously cured therewith, said microgel particles having a particle size in the range from about 20 to about 500 nm.

27. The primer of claim 26, wherein:

said polymer dispersant is an amine-terminated polyester; and, said co-dispersant is an organic amine or ammonium salt of a sulfonated copper phthalocyanine.

28. The primer of claim 27, wherein:

said primer has a carbon black pigment to d1) plus d2) ratio of from about 1:1 to about 10:1; and, a d1) to d2) ratio of from about 1:1 to about 50:1.

29. The primer of claim 28, wherein:

said hydroxy-functional polyester resin comprises one or more polyester triol resins derived from adipic acid, neopentyl glycol and trimethylol propane in a molar ratio of respectively between about 3:3:1 to about 2:2:1.

30. The primer of claim 26, wherein:

said substrate is a RIM urethane plastic.

* * * * *